(12) United States Patent
Wiercinski et al.

(10) Patent No.: US 8,079,184 B2
(45) Date of Patent: *Dec. 20, 2011

(54) SKID RESISTANT SURFACES

(75) Inventors: Robert A. Wiercinski, Lincoln, MA (US); David P. Zalanowski, Brighton, MA (US); Paul J. Westgate, Littleton, MA (US); Felek Jachimowicz, Brookline, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 568 days.

This patent is subject to a terminal disclaimer.

(21) Appl. No.: 12/063,180

(22) PCT Filed: Aug. 8, 2006

(86) PCT No.: PCT/US2006/030763
§ 371 (c)(1),
(2), (4) Date: Mar. 25, 2008

(87) PCT Pub. No.: WO2007/021653
PCT Pub. Date: Feb. 22, 2007

(65) Prior Publication Data
US 2008/0289289 A1    Nov. 27, 2008

Related U.S. Application Data

(63) Continuation-in-part of application No. 11/199,943, filed on Aug. 9, 2005, now abandoned.

(51) Int. Cl.
*E04F 11/16* (2006.01)
(52) U.S. Cl. ...... 52/177; 52/408; 52/309.1; 52/DIG. 16; 428/144

(58) Field of Classification Search ............ 52/177, 52/411, 309.1, DIG. 16; 428/144, 150, 220, 428/40.1
See application file for complete search history.

(56) References Cited

U.S. PATENT DOCUMENTS

| 3,575,779 A | 4/1971 | Chapman et al. |
| 3,741,856 A | 6/1973 | Hurst |
| 4,684,568 A | 8/1987 | Lou |
| 4,759,971 A | 7/1988 | Weissberger et al. |
| 4,929,303 A | 5/1990 | Sheth |
| 5,053,274 A * | 10/1991 | Jonas ............................ 428/332 |

(Continued)

FOREIGN PATENT DOCUMENTS

DE    1621939    8/1971

(Continued)

OTHER PUBLICATIONS

Form PCT/ISA/210 and 237, Search Report and Written Opinion, PCT/US06/030763 dated Jan. 5, 2007, 8 pages.

(Continued)

*Primary Examiner* — Eileen D Lillis
*Assistant Examiner* — Chi Nguyen
(74) *Attorney, Agent, or Firm* — Stephan P. Williams; Craig K. Leon

(57) ABSTRACT

Pedestrian trafficable skid-resistant flexible articles (24) are described. These articles (24) include a flexible substrate (17) having a non-skid coating that may be either a pressure-sensitive adhesive (13) or a highly-filled, textured binder. These articles may be applied to trafficable surfaces such as roof and floors. Articles in the form of roof underlayments having a skid-resistant surface are described in particular.

23 Claims, 10 Drawing Sheets

U.S. PATENT DOCUMENTS

| | | | |
|---|---|---|---|
| 5,096,784 | A | 3/1992 | Culbertson et al. |
| 5,496,615 | A | 3/1996 | Bartlett et al. |
| 5,523,357 | A | 6/1996 | Peterson |
| 5,687,517 | A | 11/1997 | Wiercinski et al. |
| 5,800,928 | A | 9/1998 | Fischer et al. |
| 5,869,414 | A | 2/1999 | Fischer et al. |
| 5,981,033 | A * | 11/1999 | Haunschild et al. ........ 428/182 |
| 6,184,496 | B1 * | 2/2001 | Pearce ........................ 219/213 |
| 6,308,482 | B1 | 10/2001 | Strait |
| 6,372,323 | B1 * | 4/2002 | Kobe et al. ................ 428/119 |
| 6,468,678 | B1 * | 10/2002 | Dahlin et al. ............... 428/800 |
| 6,500,520 | B1 | 12/2002 | Wiercinski et al. |
| 6,769,215 | B1 | 8/2004 | Carkner |
| 6,921,566 | B2 * | 7/2005 | Lipstein ..................... 428/40.1 |
| 7,634,877 | B2 * | 12/2009 | Wiercinski ................... 52/177 |
| 2002/0009580 | A1 | 1/2002 | Phillips |
| 2003/0215594 | A1 | 11/2003 | Hamdar et al. |
| 2004/0118059 | A1 * | 6/2004 | Ohno et al. ................... 52/177 |
| 2004/0127120 | A1 | 7/2004 | Zanchetta et al. |
| 2004/0192130 | A1 | 9/2004 | Baciu et al. |
| 2005/0053746 | A1 | 3/2005 | Bartek |

FOREIGN PATENT DOCUMENTS

| | | |
|---|---|---|
| WO | WO-97/29256 | 8/1997 |
| WO | WO-03/097349 | 11/2003 |
| WO | WO-2004/015216 | 2/2004 |
| ZA | 919263 | 11/1991 |

OTHER PUBLICATIONS

Form PCT/IPEA/409, International Preliminary Report on Patentability, PCT/US06/030763 dated May 14, 2008, 10 pages.

* cited by examiner

SKID RESISTANT SURFACES

CROSS-REFERENCE TO RELATED APPLICATIONS

This application is a continuation-in-part of application Ser. No. 11/199,943 filed on Aug. 9, 2005, now abandoned from which priority is claimed and the disclosure of which is incorporated herein by reference.

FIELD OF THE INVENTION

The present invention relates to skid-resistant surfaces especially when wet, and in particular to skid-resistant trafficable surfaces such as roofs and floors as well as skid resistant packaging for lumber and the like.

BACKGROUND OF THE INVENTION

Roofing underlayments are typically installed over the roof deck and under the primary roof covering or overlayment, which can be asphalt shingles, metal shingles, or metal roofing, tiles such as Spanish or slate tile, wood shakes, concrete, slate, etc. The underlayment provides a secondary moisture barrier to protect the roof deck and building interior from moisture that may penetrate through the primary roof covering. Commercially effective underlayments must maintain their strength and integrity even after exposure to the elements. Underlayments are used both in new construction and in re-roofing projects.

It is known in the waterproofing art to combine a preformed waterproofing membrane, such as a rubberized bitumen/oil layer, with a carrier support sheet or film, and to utilize this as an underlayment. The carrier support film may comprise a variety of materials, such as rubber, plastic, and/or metal, or combinations of the same. The use of metals is desirable, for example, to improve dimensional stability of the support film, which is subjected to oil migration from the oil-plasticized bitumen layer. It has also been desirable to employ cross-laminated plastic films, such as high density polyethylene, for improved stability of the carrier support sheet.

Such pre-formed waterproofing membrane laminates are considered "sheet-like" because they are sufficiently flexible that they can be rolled up and transported after manufacture to the job site where they are unrolled and installed on the building surface. This kind of membrane laminate, useful as an underlayment on sloped roofs, is commercially available from Grace Construction Products (W. R. Grace & Co.—Conn) under the name "ICE & WATER SHIELD"(a registered trademark of W. R. Grace & Co.—Conn.) The underlayment is applied to the roof deck before installation of the overlayment. The function of the membrane underlayment is to seal around roofing fasteners and to protect against damage from ice dams and wind-driven rain.

Another commercially available example of an underlayment is "TRI-FLEX 30", (a product also available from Grace Construction Products) which is spun-bonded polypropylene coated with a thin layer comprising U.V. stabilized polypropylene on both of its surfaces.

In addition to its water shedding capabilities, an important characteristic of a roofing underlayment is its skid or slip resistance. Since roofing applicators must walk on the underlayment during roofing installation, the exposed surface should have a sufficiently high coefficient of friction, even when wet, so as to minimize or prevent an applicator from slipping when walking or standing on the surface. Skid resistant underlayments are disclosed, for example, in U.S. Pat. Nos. 5,687,517, 6,308,482, US 2003/0215594 and US 2004/0127120. Other types of membranes or sheets containing particles or filler materials of various types are disclosed, for example, in US 2004/0192130, U.S. Pat. Nos. 5,496,615, 4,994,328 and 6,500,520.

It is also desirable that the roofing underlayment be rollable for ease of transportation and handling, and be readily unrollable, ideally by a single person, for application. However, maintaining unrollability while providing sufficient skid resistance can be problematic, particularly where the skid resistance is due to the tackiness or stickiness of the walking surface. That is, the same tackiness that is advantageously used to provide skid resistance can make it difficult or impossible to unroll the underlayment, particularly if the unrolling is to be carried out by only one person.

It is also desirable that the underlayment be light in weight, i.e. low weight per unit area. Lightweight provides for easier transportation to the roofdeck and easier installation. Some underlayments comprise a heavy layer of a large particulate that provides for a heavyweight membrane.

It therefore would be desirable to provide a lightweight roofing underlayment having excellent skid resistance while maintaining unrollability.

SUMMARY OF THE INVENTION

One embodiment of the invention is the provision of a slid-resistant surface comprising a substrate coated with a slid resistant layer. In particular, the present invention provides a pedestrian trafficable slid-resistant flexible article, the article adapted to be stored in a roll and unrolled prior to application to a surface. The article comprises a flexible substrate suitable for application to a roof, floor or package (e.g., a pallet of goods), the substrate having a first major surface (e.g., a lower surface) adapted to contact said roof, floor or package and an opposite second major surface (e.g., an upper surface) adapted to be exposed to pedestrian (or foot) traffic. The second major surface has a non-skid coating comprising a pressure sensitive adhesive or a filled textured binder. Preferably, the flexible article is in the form of a roofing underlayment, wherein upon application of said underlayment to a roof, the non-skid coating provides a slid resistant surface for foot traffic thereon. Another application is flexible packaging, such as bags, coated with the non-skid coating, which may be stacked without sliding over one another.

In another embodiment of the invention, the skid-resistant flexible article is in the form of a lightweight roofing underlayment having excellent skid or slip-resistance to foot traffic under dry, wet and/or dusty conditions on a sloped surface, and is both readily rollable and unrollable as a coherent unit. The underlayment is preferably a multi-layered sheet material that includes a support layer comprised of a film or fabric or both, and a skid or slip resistant layer on one or both faces of the support layer. The skid or slip resistant layer is preferably a pressure sensitive adhesive or a highly filled textured binder. The resulting sheet-like underlayment is sufficiently flexible to allow it to be formed into rolls and readily installed by unrolling over a support structure such as a roof deck. It also provides a sloped walking surface having a high coefficient of friction and excellent skid resistance even when wet and/or dusty, and even at high roof pitches such as those between about 4:12 and 12:12.

In its method aspects, the present invention relates to a method of forming a skid-resistant flexible article useful for example as a roofing underlayment by coating a thin layer of a pressure sensitive adhesive or a filled textured binder onto a flexible substrate that may include a support layer such as a film or fabric, and to a method of waterproofing a roof or floor by unrolling the underlayment and applying it to the roof or floor such as by mechanical fastening or with an adhesive.

The present invention also includes a method of malting a pedestrian trafficable slid-resistant flexible article comprising providing a flexible substrate suitable for application to a roof, floor or package, said substrate having a first major surface adapted to contact said roof, floor or package and an opposite second major surface adapted to be exposed to pedestrian traffic;

coating said second major surface with a non-slid coating comprising a binder, filler particles and a solvent for the binder; and evaporating the solvent from said non-skid coating, whereby the filler particles are substantially coated by the binder.

Another embodiment of the invention is an organic or inorganic roofing felt coated with a pressure sensitive adhesive or a highly filled textured binder.

Another embodiment of the invention is an exposed roofing membrane coated with a pressure sensitive adhesive or a highly filled textured binder.

Another embodiment of the invention is a roof decking comprising plywood or other decking material such as oriented strand board coated with a pressure sensitive adhesive or a highly filled textured binder.

Another embodiment of the invention is non-skid flexible packaging comprising a support layer coated with a pressure sensitive adhesive or a highly filled textured binder.

DETAILED DESCRIPTION OF THE PREFERRED EMBODIMENTS

One embodiment of the invention is a skid-resistant flexible article comprising a flexible substrate coated with a non-skid coating (or skid resistant layer) that is skid resistant particularly when wet. The non-skid coating preferably comprises a pressure sensitive adhesive or a highly filled textured binder. The article is suitable for application to a pedestrian trafficable surface such as a roofing surface or a flooring surface. Articles suitable for roofing surfaces include rollable roofing underlayments including synthetic polymeric mechanically attached underlayments, synthetic polymeric adhesively attached underlayments, organic and inorganic asphalt saturated roofing felts, liquid-applied roofing surfaces including urethanes, asphaltic-based materials, acrylics, and silicones, etc. Articles suitable for roofing surfaces further may be rollable exposed roofing membranes including rubber sheets, vinyl sheets, and TPO sheets. Flooring surfaces include wood-based materials, Portland cement-based materials, ceramic materials, naturally occurring stone materials, and synthetic polymeric materials as well as composite materials containing combinations of the foregoing.

Figure 1:
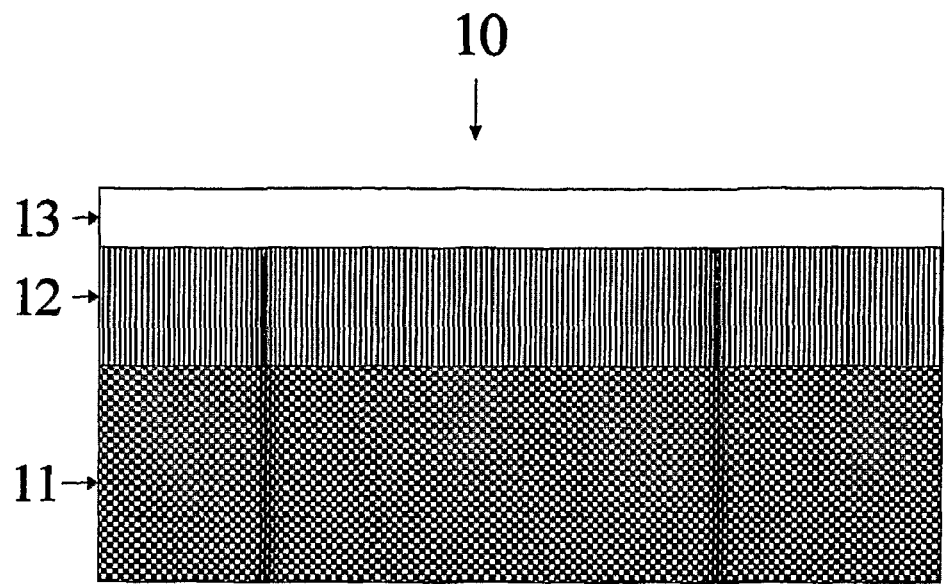
FIG. 1 is a schematic diagram of a roofing underlayment in accordance with one embodiment of the present invention.

Turning first to FIG. 1, there is shown one embodiment of the article of the present invention in the form of underlayment 10. The underlayment 10 has an uppermost layer 13 of the non-skid coating (or skid-resistant layer) of the invention supported by a flexible substrate or support layer which can be one or more layers of a film or fabric, or both. In the embodiment shown in FIG. 1, the support layer is comprised of a lowermost layer 11 of fabric and an intermediate layer 12 of film. Suitable films 12 are those comprised of a synthetic organic polymer such as a polyolefin or a blend of polyolefins, and films mentioned as suitable for this layer hereinafter. The preferred film is polypropylene or polyethylene or films made from mixtures of such. The present invention also contemplates the use of more than one film layer, such as layers laminated and/or co-extruded or cross-laminated together. Those skilled in the art will appreciate that the underlayments can be produced by any method known in the art such as extrusion, lamination and calendaring. The film layer 12 has a thickness in the range from 0.5 mils to 10 mils (0.013 mm to 0.25 mm). Preferably, the thickness is in the range from 1 mil to 3 mils (0.025 mm to 0.076 mm).

Suitable fabrics for use in the support layer 11 include both natural and synthetic woven and non-woven fabrics, and preferably is synthetic such as a polyolefin, such as polypropylene or polyethylene, a polyester, etc., or glass. Preferably the woven fabric has less than or equal to 25 percent open space. Woven and non-woven fabrics exhibit a weight ranging from 0.5 oz/yd$^2$ (16.9 g/m$^2$) to 10 oz/yd$^2$ (339 g/m$^2$). Preferably, woven and non-woven fabrics exhibit a weight in the range from 1 oz/yd$^2$ (33.9 g/m$^2$) to 3 oz/yd$^2$ (102 g/m$^2$).

In the particular embodiment of FIG. 1, the flexible substrate includes a support layer comprised of (i) a non-woven or woven fabric layer 11, and (ii) a synthetic organic polymer film 12 attached to one surface of the fabric 11. On the surface of the synthetic organic polymer film 12 is a non-skid coating (or skid-resistance layer) 13, which is a pressure sensitive adhesive or a highly filled textured binder. It is this skid-resistance layer 13 that provides the walling surface for the roof applicator, and is ultimately covered by the primary roof covering or overlayment such as shingles or tiles.

In the case where fabric layer 11 is a non-woven fabric, it may be comprised of one or more synthetic organic polymers such as polyolefins, for example polypropylene or polyethylene, or may be comprised of polyester. Polypropylene is preferred. Where fabric layer 11 is a woven fabric, it may be comprised of one or more one or more synthetic polymers such as polyolefins, for example polypropylene, or polyethylene, or may be comprised of polyester. The fabric may also comprise a woven or non-woven glass fiber mat. Fabrics comprised of polypropylene are preferred for use in the embodiment shown in FIG. 1.

The synthetic polymer film 12 as aforementioned comprises one or more polymers such as polyolefins, for example polypropylene, polyethylene, a polymer comprising ethylene and propylene, a polymer comprising ethylene and methyl acrylate, a polymer comprising ethylene and ethyl acrylate, a polymer comprising ethylene and butyl acrylate, a polymer comprising ethylene and an alpha olefin, a polymer comprising ethylene and vinyl acetate or polyester, and includes mixtures of the foregoing. Polyethylene, polypropylene, and mixtures of the two are preferred. The synthetic polymer film 12 may also be a coextruded film layer (not shown as such in FIG. 1). Each layer may comprise one or more of the polymers listed above.

The laminate comprising the non-woven or woven fabric 11 attached to a synthetic organic polymer film 12 may be manufactured by extrusion coating the layer 12 as a polymer melt onto the fabric.

Materials suitable for use as the pressure sensitive adhesive layer 13 comprise rubbers such as those selected from the group consisting of SIS (styrene-isoprene-styrene block copolymers), SBS (styrene-butadiene-styrene block copolymers), SEBS (styrene-ethylene-butylene-styrene block copolymers), SBR (styrene-butadiene rubber), natural rubber, silicone rubber, butyl rubber, polyisoprene, polyisobutylene, chloroprene, ethylene-propylene rubber, ethylene alpha olefin, polybutadiene, nitrile rubbers, and acrylic rubber. A rubber modified bitumen pressure sensitive adhesive may also be used. All of the rubbers listed above, except silicone, may be blended with bitumen to produce a pressure sensitive adhesive. Preferably the pressure sensitive adhesive comprises a weatherable rubber such as those selected from the group consisting of SEBS, polyisobutylene, acrylic, silicone, and butyl. Preferably the pressure sensitive adhesive used is free of surfactant, since the presence of surfactant tends to reduce the slid resistance when the surface is wet.

A pressure sensitive adhesive generally comprises a rubber, a tackifier, and a plasticizer. The plasticizer and tackifier modify the properties of the rubber to make it pressure sensitive. A plasticizer is generally a low molecular weight ingredient that is compatible with the rubber (e.g., a naphthenic or aliphatic oil). It lowers the plateau modulus of a mixture of rubber and plasticizer vs. the rubber alone. A tackifier is generally a low molecular weight ingredient (e.g., a C5 or C9 hydrocarbon resin) that is compatible with the rubber and increases the glass transition temperature of the rubber blend. It also lowers the plateau modulus of the rubber blend vs. the rubber alone. These features are known to those skilled in the art of pressure sensitive adhesive formulation.

The pressure sensitive adhesive may comprise rubber alone. Such is the case for some acrylic polymers such as butyl acrylate and ethyl-hexyl acrylate that are inherently pressure sensitive.

Preferably the pressure sensitive adhesive layer 13 is used in a thickness of less than or equal to about 10 μm, more preferably less than or equal to about 5 μm. Use of such a thin pressure sensitive layer insures good skid resistance, including wet skid resistance, while maintaining the ability to unroll the membrane and insure that a pedestrian does not stick to the surface while walking on it. The ability to unroll and/or to prevent too much adhesiveness is measured using an accelerated blocking test as described in Example 1. Following this test, one can measure the blocking level as a peel force in pounds per square inch (pli). It is preferred that coatings of the present invention have a blocking level of less than 1 pli, preferably about 0.5 pli or less (e.g., 0.05 to 0.5 pli).

For embodiments where the non-skid coating 13 is a pressure sensitive adhesive, the pressure sensitive adhesive exhibits a minimum peel adhesion value of 1 pound per linear inch (pli) to the support sheet. Adhesion is measured by applying a one inch wide tape comprising a 5 mil (0.13 mm) layer of the pressure sensitive adhesive laminated to the face of a 4 mil (0.10 mm) thick cross-laminated, high density polyethylene sheet such as "Valeron", a commercial product of Valeron Strength Films, to the substrate. This "tape" may be prepared by coating the pressure sensitive adhesive from solution and drying, or coating the molten pressure sensitive adhesive at elevated temperature onto the 4 mil Valeron. The face of the pressure sensitive adhesive side of the one inch wide tape is applied to the substrate. The construction is rolled in four times in one second passes with a 30 pound roller. Adhesion is measured fifteen minutes later with a mechanical test device such as an Instron using a peel angle of 90 degrees and a cross-head speed of 2 in./min.

In the embodiment where the non-skid coating 13 is a filled textured binder, the binder is a material that adheres to both the filler and the support sheet, as described in a test below, and is organic solvent soluble. Preferred binders include: pressure sensitive adhesives as described above for a skid resistant layer comprising only a pressure sensitive adhesive, rubbers, and resins. Another preferred binder comprises an amorphous polyolefin like those produced by Eastman Chemical under the trade name "Eastoflex."

For binders that comprise a rubber, the rubber is selected from the group consisting of SIS (styrene-isoprene-styrene block copolymers), SBS (styrene-butadiene-styrene block copolymers), SEBS (styrene-ethylene-butylene-styrene block copolymers), SBR (styrene-butadiene rubber), natural rubber, silicone rubber, butyl rubber, polyisoprene, polyisobutylene, chloroprene, ethylene-propylene rubber, ethylene alpha olefin, polybutadiene, nitrile rubbers, thermoplastic polyurethanes (TPUs), thermoplastic polyolefins (TPOs), and acrylic rubber. Preferably the rubber is weatherable such as those selected from the group consisting of SEBS, polyisobutylene, acrylic, silicone, and butyl. Preferably the rubber used is free of surfactant, since the presence of surfactant tends to reduce the skid resistance when the surface is wet.

For binders that comprise a resin the resin may be selected from a group of materials including hydrocarbon resins, C-5 hydrocarbon resins, C-9 hydrocarbon resins, $(C-5)_2$ hydrocarbon resins, rosin acids, rosin esters, terpene resins, coumarone indene resins, phenol formaldehyde resins, urea formaldehyde resins, melamine resins, polyester resins, acrylic resins, alkyd resins, bitumen, aldehyde and ketone resins, amides and polyamides, amines and polyamines, maleic resins, melamine resins, oxazole resins, phenolic resins, phenoxy resins, phthalic anhydrides, styrene resins, urea resins, vinyl resins. Preferably, the resin has a Tg or ring and ball softening point that is greater than or exceeds 75° F. More preferably the resin has a Tg or ring and ball softening point that is greater than or exceeds 140° F.

Adhesion of the filled textured binder to the support sheet (or substrate) is measured in a peel adhesion test using a pre-formed pressure sensitive tape. A 2 in. wide preformed tape, Preprufe® Tape (W. R. Grace Co.—Conn.), is applied to the non-skid coated face of the underlayment. The sample is rolled 4 times, at 1 second per pass, with a 30 lb roller. Adhesion is measured in a T-peel adhesion test 15 min after rolling at a cross head speed of 2 in. per minute with an Instron mechanical tester. The peel adhesion value must be greater than 1 pound per linear inch (pli). Preferably, the adhesion value is greater than 2 pounds per linear inch.

Figure 7A:
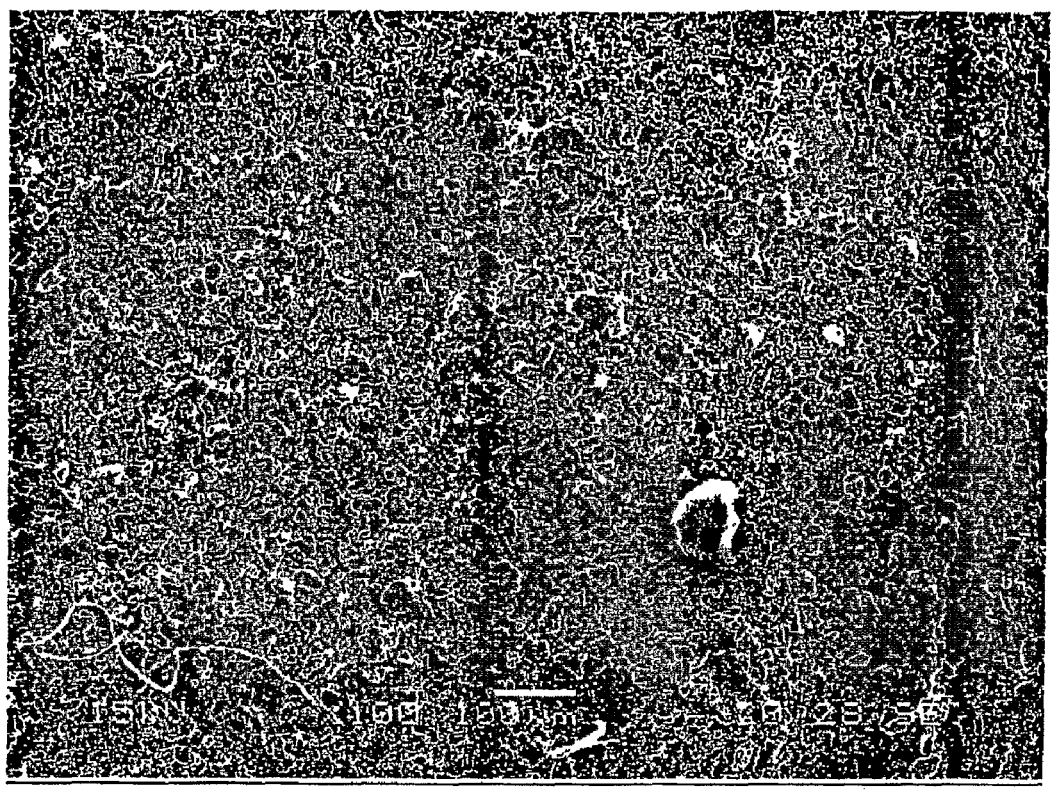
FIGS. 7A-7C are photomicrographs of a non-skids surface of the invention comprising a filled textured binder, looking down from above at the surface.
Figure 7B:
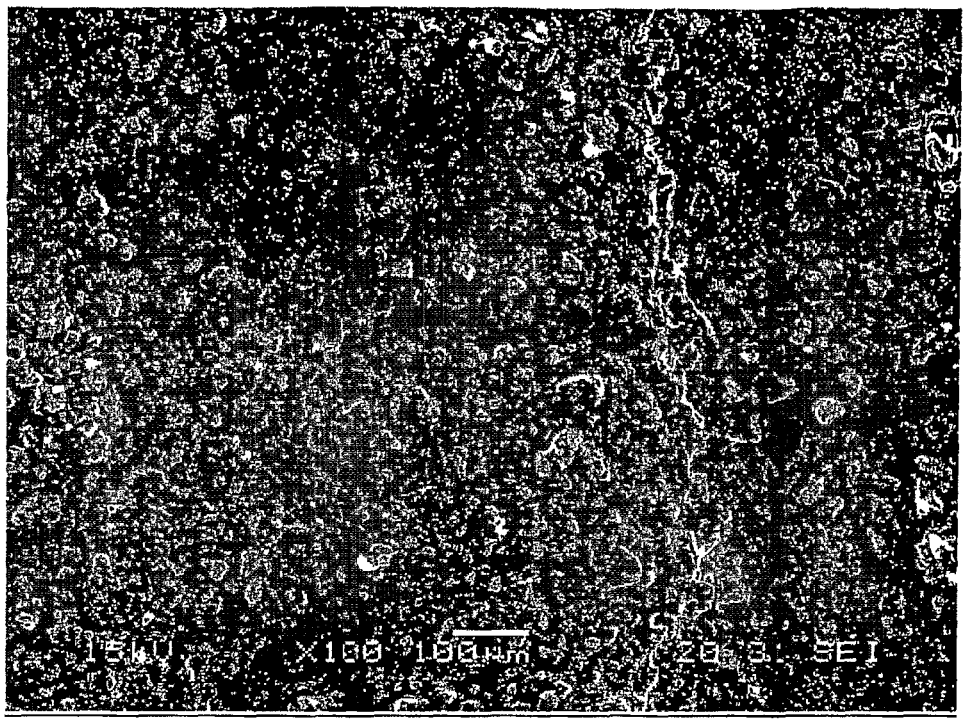
Figure 7C:
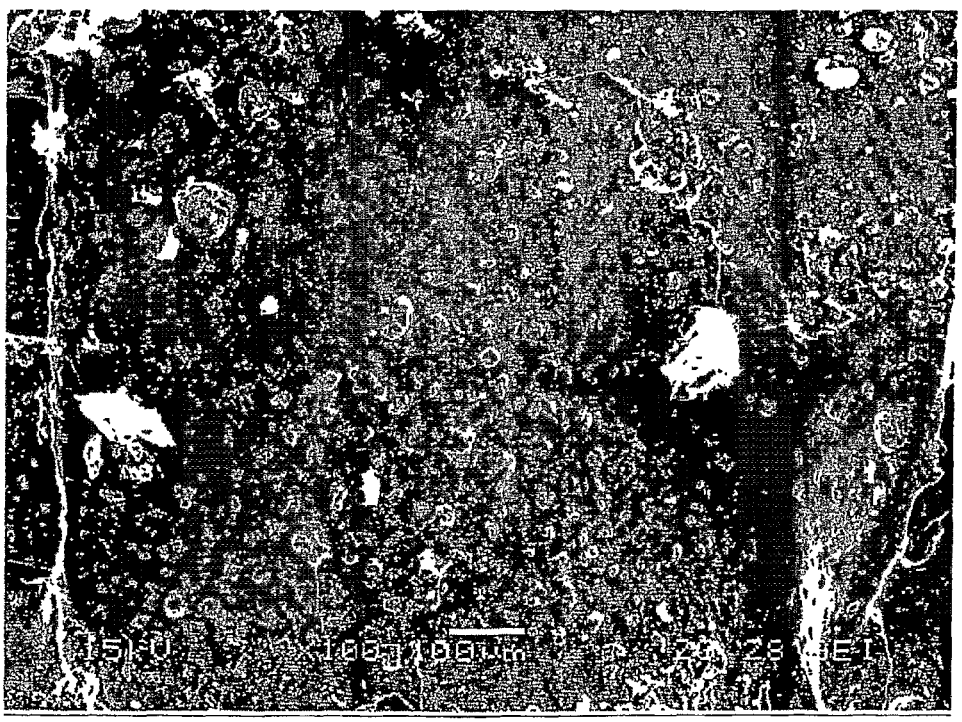

In the embodiment where the skid resistant layer 13 is a filled textured binder the filler particles, including those on the exterior surface of the coating, are preferably substantially coated with binder and the coating is textured. "Substantially coated" means that at least about 95 percent of the filler particle's surface is coated. More preferably, substantially coated means that at least 98%, and most preferably at least 99%, of the filler particles within a selected area (e.g., 100 cm$^2$) are completely coated or encapsulated by the binder coating material. By "textured" is meant that the filler particles protrude from the surface and, thus, the surface coating is uneven (or textured) rather than being smooth or planar. This texturing is clearly visible, as shown in FIGS. 7A to 7C, where the individual coated filler particles are shown in SEM photomicrographs. The filler particles are substantially coated with binder as a result of the preferred manufacturing process. This process involves producing a coating comprising the binder, the filler particles, and a solvent that dissolves the binder, applying the coating to a substrate, and removing the solvent by evaporation thereby depositing a layer of coating containing the encapsulated filler particles onto the substrate.

The filler particles may be inorganic or organic and are included in an amount of at least about 25 percent by volume of the filled textured binder (i.e., the dried coating after solvent evaporation), preferably in an amount of at least about 33 percent by volume, more preferably in an amount of at least about 45 percent by volume, most preferably at least 50% by volume. Use of a high filler volume, including amounts up to about 75%, insures that the filled binder is textured. A range of about 30% to 60% filler by volume is ideal. If the filler volume is too low the layer is relatively smooth. The filler has a maximum average particle size of up to about 100 µm. Preferably the filler has a maximum average particle size of less than about 50 µm. More preferably the filler has a maximum average particle size of up to about 25 µm. Filler particles in the range of about 0.1 m to about 20 µm, preferably about 0.5 µm to about 15 µm, are ideal. Larger particle sizes hinder the coating application process, and add excessive weight to the underlayment. The term "particles" as used herein is intended to encompass particles having regular (e.g., spherical) or irregular shapes, as well as shards. Suitable inorganic fillers include calcium carbonate, silica, clay, talc, vermiculite, mica, titanium dioxide, fly ash, alumina trihydrate, and slag. The fillers may be surface treated with a bonding agent to enhance bonding to the binder and ease of dispersion in the solvent. Optional bonding agents include silanes, titinates, and long chain acids like stearic acid. In addition a dispersant may be used to aid in the dispersion of filler particles in the solvent. The coating volume of the filled textured binder layer is up to about 10 cubic centimeters per square foot (cm$^3$/ft$^2$) (107.6 cm$^3$/m$^2$), preferably less than about 5cm$^3$/ft$^2$ (53.8 cm$^3$/m$^2$), more preferably less than about 2cm$^3$/ft$^2$ (21.5 cm$^3$/m$^2$), and most preferably less than about 1 cm$^3$/ft$^2$ (10.8 cm$^3$/m$^2$). An ideal volume is 0.2-2 cm$^3$/ft$^2$ (2.15-21.5 cm$^3$/m$^2$).

Inorganic particulates that react with water may also be used. These include Portland cement, calcium oxide, high-alumina cement, blast furnace slag, pozzolanas, and pozzolanic cement. These fillers may hydrate after the underlayment is installed on the roof deck. The net effect is an increase in the average size of the particulate after the membrane is installed.

Some underlayments of the present invention are textured at two levels. These include embodiments where the support sheet comprises a woven or a non-woven fabric in direct contact with non-skid layer 13 or separated from non-skid layer 13 by a thin polymer film 12. One level of texturing is provided by the filler. Another level of texturing is provided by the fabric. While not being bound by theory, it is believed that both levels of texturing contribute to the performance of the underlayments. The dual texturing enhances resistance to "blocking" (the tendency of the front face of the underlayment to stick to its rear face when unrolled) by minimizing contact between opposite faces of the underlayment within a roll of underlayment. The dual texturing also enhances skid resistance by enhancing mechanical interlock between the surface of the underlayment and the sole of a shoe in contact with the surface of the underlayment. The dual texturing also enhances skid resistance by providing channels for lubricant migration when a shoe sole comes into contact with an underlayment that is coated with lubricant(s). Lubricants include water and dirt. To avoid skidding the lubricant must be channeled away from the contact area between a shoe sole and the surface of the underlayment.

The pressure sensitive adhesive layer and the filled textured binder layer are preferably coated as a solution in an organic solvent. For example, a coating solution comprising binder, filler particles and an organic solvent is coated onto a flexible substrate comprising the support layer, and the solvent is removed by evaporation to leave the non-skid coating. The coating solution may be applied to the substrate by brush, roller, or spray application, and may be a continuous process such as spray, roll coating, gravure coating, knife coating, and wire wound rod coating (i.e., Meyer rod coating). The resulting coated substrate can then be wound into a roll. Suitable organic solvents include those that will completely dissolve the pressure sensitive adhesive or the binder and also exhibit a high vapor pressure so that evaporation can be affected quickly in the coating process. For example, hydrocarbon solvents such as heptane may be used. Other useful solvents include methyl ethyl ketone and toluene. It is also contemplated that the coating solution may be applied as an aqueous emulsion.

Another embodiment of the invention includes a skid resistant flexible article in the form of a roofing underlayment comprising a woven fabric, a non-woven fabric, a film, or a combination of these and a non-skid coating comprising a pressure sensitive adhesive or a highly filled textured binder. A preferred underlayment comprises a spun bonded polypropylene substrate, both sides of which have been extrusion coated with a polyolefin, and an underlayment comprising a woven fabric that is laminated to a polyolefin film.

Figure 2:
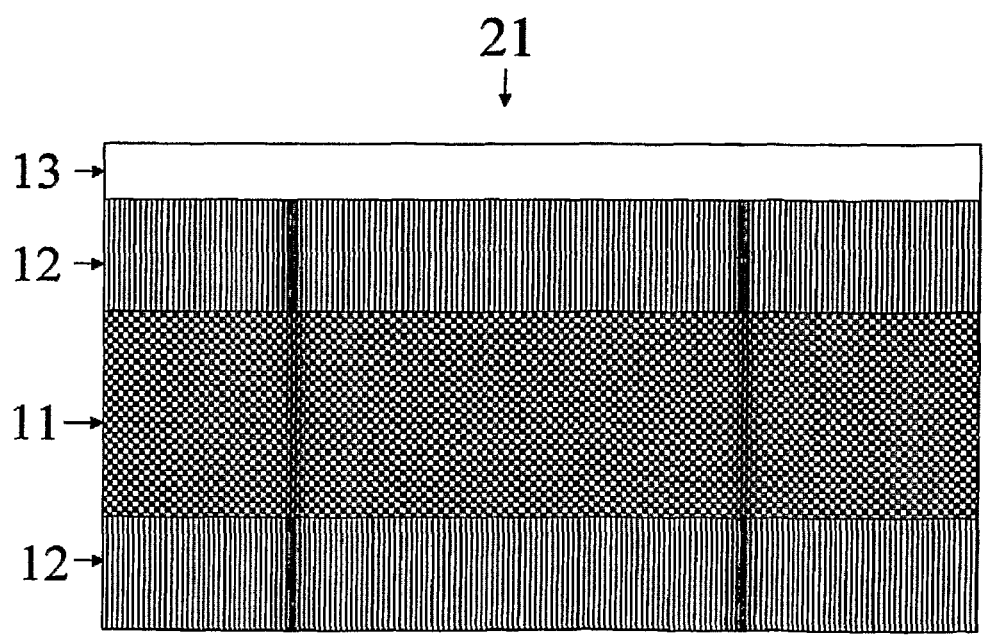
FIG. 2 is a schematic diagram of a roofing underlayment in accordance with another embodiment of the present invention.

FIG. 2 illustrates a second embodiment of the present invention. The underlayment 21 comprises a non-woven or woven fabric layer 11, a synthetic organic polymer film layer 12 adhered to both faces of the fabric 11, and a pressure sensitive adhesive layer or filled textured binder layer 13 on the surface of the polymer film 12. The polymer film 12 may be a coextruded layer (not shown) polymer film.

Figure 3:
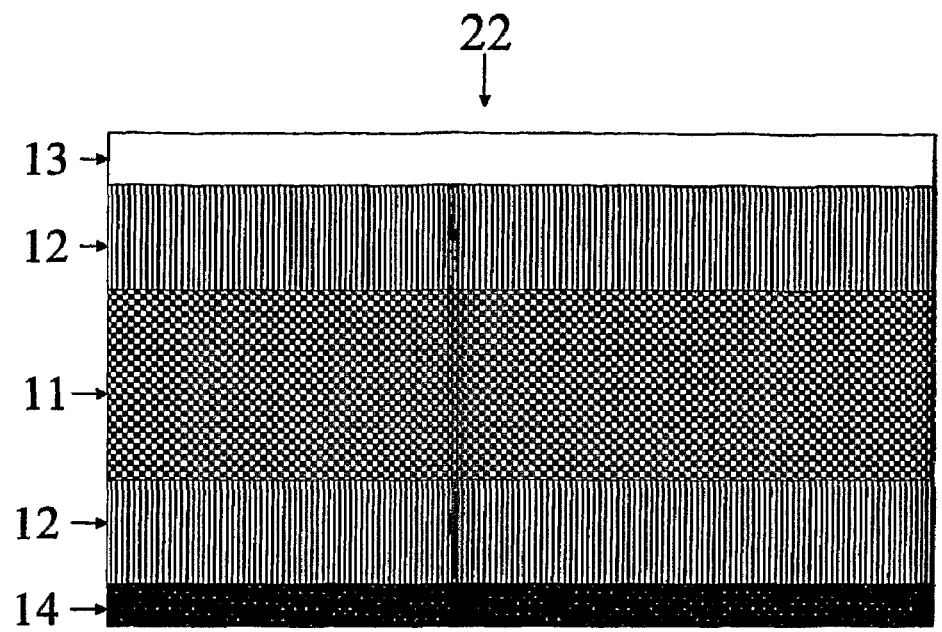
FIG. 3 is a schematic diagram of a roofing underlayment in accordance with yet another embodiment of the present invention.

Yet another embodiment is shown in FIG. 3, where the underlayment 22 comprises a non-woven or woven fabric 11, a synthetic organic polymer film 12 adhered to both faces of the fabric 11, a pressure sensitive adhesive layer or filled textured binder layer 13 on the surface of one of the polymer film layers 12, and a further non-skid layer 14 on the surface of the other polymer film layer 12. The non-skid layer 14 can minimize or prevent relative movement between the underlayment and the roofing deck during and after installation. Suitable non-skid layers 14 include one or more polyolefins such as polyethylene, polypropylene, a polymer comprising ethylene and propylene, a polymer comprising ethylene and methyl acrylate, a polymer comprising ethylene and ethyl acrylate, a polymer comprising ethylene and butyl acrylate, a polymer comprising ethylene and vinyl acetate, a polymer comprising ethylene and an alpha olefin, and a polymer comprising ethylene and octene. The non-skid layer 14 preferably has a thickness of less than about 1 mil (0.0254 mm), and exhibits a Shore D hardness, ASTM D2240, of less than about 45.

The multi-layer synthetic organic polymer film 12 and 14 in FIG. 3 may be co-extrusion coated onto the fabric 11 to produce a structure comprising layers 11, 12 and 14 of underlayment 22. Synthetic polymer layer 12 is extrusion coated to the other face of fabric 11. This may also be a coextruded layer (not shown) The non-skid layer 13 then may be applied to such structures to produce the underlayment of FIG. 3 by coating, as a mixture with an organic solvent that dissolves the organic portion of the coating, onto a web comprising a support in a continuous web coating operation. The solvent is removed by evaporation and the resulting underlayment is wound into rolls. Various types of coaters may be used to apply the organic solvent based coating, including wire wound rod (also called Meyer rod), roll coater, gravure coater, air knife, and a knife over roll coater.

Figure 8:
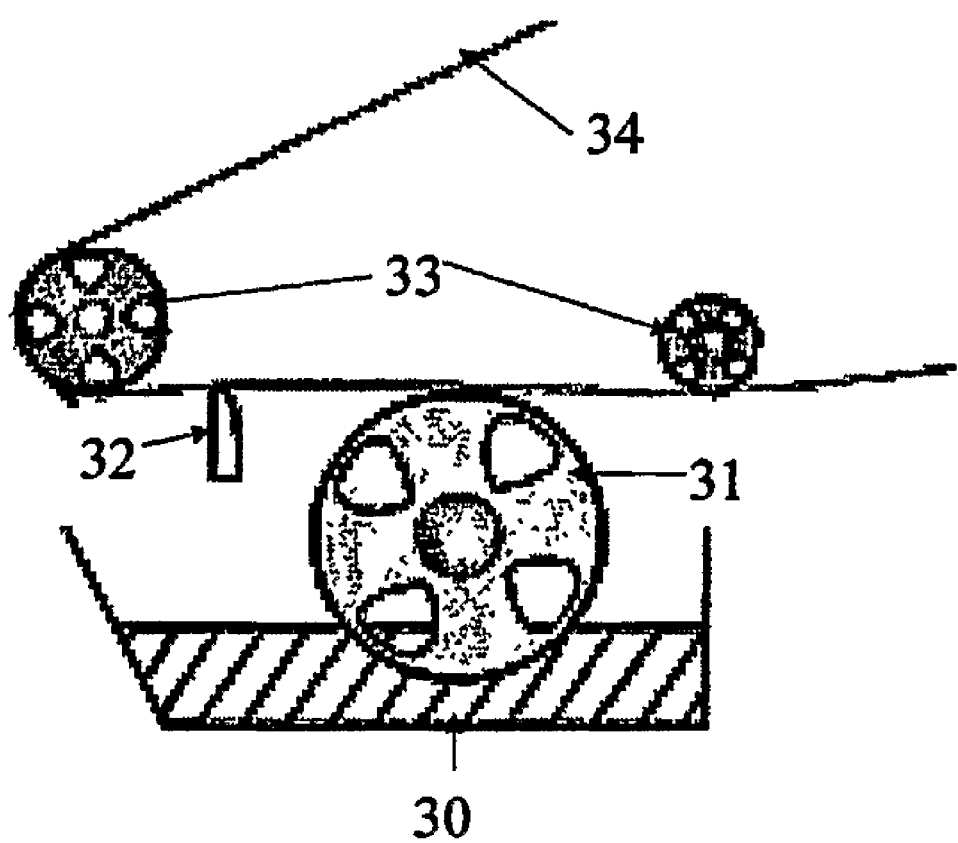
FIG. 8 is a schematic of a Meyer rod coater.
Figure 9:
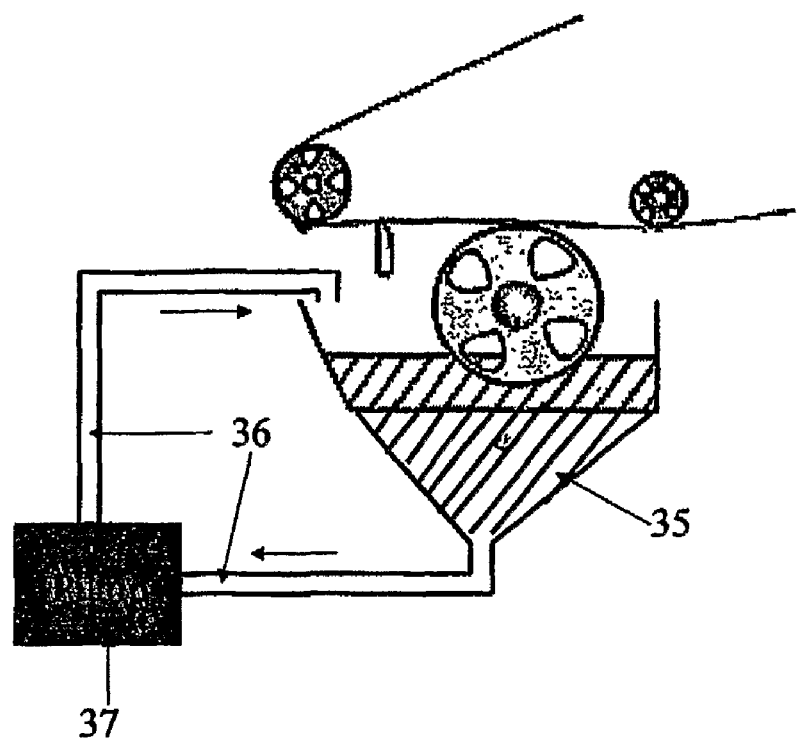
FIG. 9 is a schematic of a modified Meyer rod coater.

FIG. 8 is a schematic of "Meyer" rod coating using a wire wound rod, the preferred coating method used herein. In Meyer rod coating, a coating roll 31 is situated in a bath 30 filled with coating. A layer of coating is deposited on the coating roll 31 as the roll is rotated. Coating from the roll is transferred to the web 34 comprising the support sheet. The wire-wound metering rod 32 sometimes known as a "Meyer Bar", allows the desired quantity of the coating to remain on the substrate 34. The excess coating is deposited back into the pan 30. The quantity metered on to the substrate is determined by the diameter of the wire used on the rod. For coatings comprising a highly filled textured binder the machine design may be modified to accommodate potential problems with filler settling during the coating process. Filler particles may tend to settle in the bath 30 of FIG. 8. This is particularly important when a low viscosity coating is applied. One option is to recirculate the coating in the pan. This may be facilitated with a tapered pan 25 design and recirculation system 36 and 37 as shown in FIG. 9.

Figure 10:
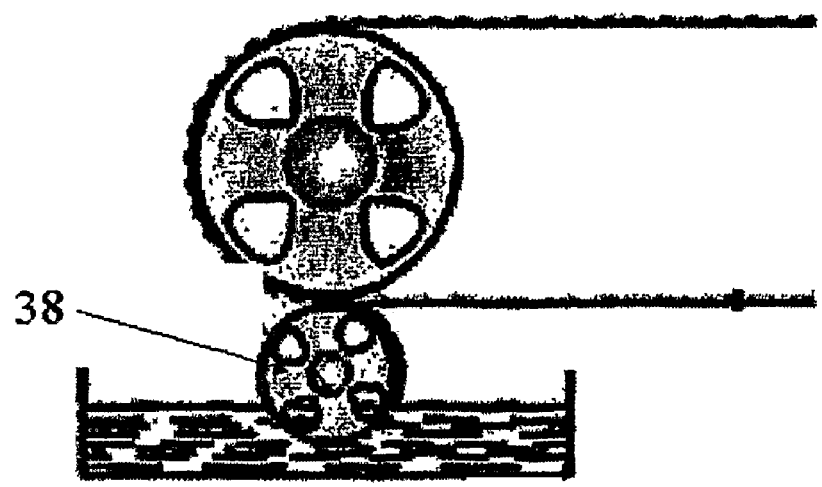
FIG. 10 is a schematic of a gravure coater.

FIG. 10 shows a schematic of gravure coating. The gravure coater depends on an engraved roller 38 running in a coating bath that fills the imprinted dots or lines of the roller with the coating material. The excess coating on the roller is removed by the doctor blade and the coating is then deposited onto the substrate as it passes through the engraved roller and a pressure roller. As immediately applied to the web, the coating is textured. If the coating viscosity is low and or solvent evaporation is slow, the textured pattern levels to produce a smooth coating except for filler particles that are thicker than the binder layer. If the coating viscosity is high and or solvent evaporation is fast, then a textured pattern results after solvent evaporation. This may be affected for a non-skid layer comprising a pressure sensitive adhesive (no filler) or a filled textured binder. For a non-skid layer comprising a filled textured binder the net effect is to have 2 levels of texturing. The smaller-scale texturing is contributed by the filler particles. The larger-scale texturing is related to the gravure roll pattern.

Figure 4:
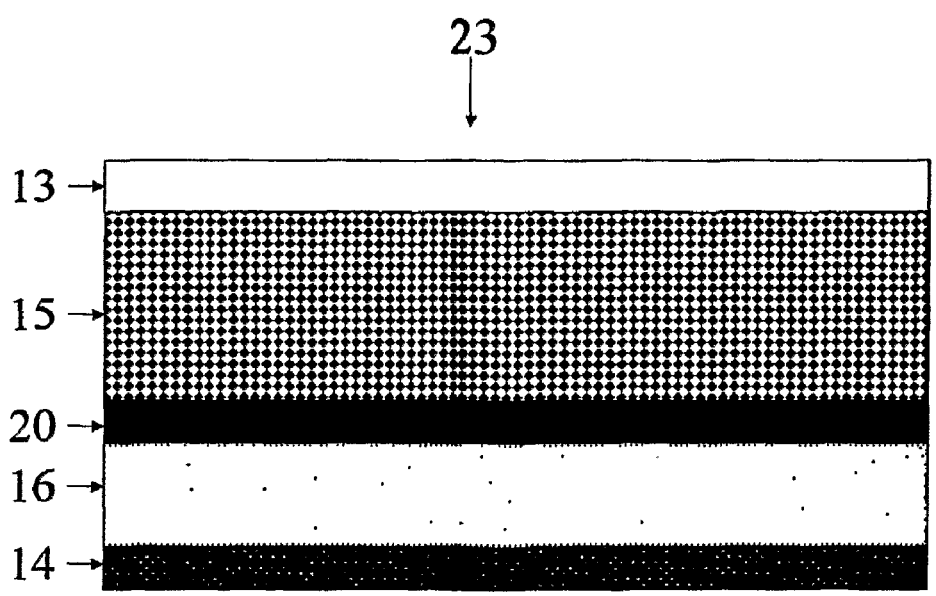
FIG. 4 is a schematic diagram of a roofing underlayment in accordance with still another embodiment of the present invention.

FIG. 4 illustrates a further embodiment 23 that comprises a woven fabric layer 15 with less than or equal to 25 percent open space, a pressure sensitive adhesive layer or filled textured binder layer 13, a lamination layer 20, a polymer film 16 and a second non-skid layer 14. Layer 15 comprises a material selected from a list including polyethylene, polypropylene, polyester, or glass. The weight of layer 15 is 0.5 oz/yd$^2$ to 10 oz/yd$^2$ (16.9 g/m$^2$ to 339 g/m$^2$). Preferably, the weight of layer 15 is 1 oz/yd$^2$ to 3 oz/yd$^2$ (33.9 g/m$^2$ to 102 g/m$^2$). Options for materials for layer 14 are described above. Layer 16 is a polymer film comprising one or more materials selected from the group including polypropylene, polyethylene, a polyolefin, or polyester. The thickness of layer 16 is 0.5 mils to 10 mils (0.013 mm to 0.254 mm). Preferably the thickness of layer 16 is 1 to 3 mils (0.025 mm to 0.076 mm). Polypropylene is preferred. Layer 20 adheres layer 15 to layer 16. Layer 20 may comprise the same materials as previously described above for layer 12. The film layer 20 has a thickness in the range from 0.5 mils to 10 mils (0.013 mm to 0.254 mm). Preferably, the thickness of layer 20 is in the range of 1 to 3 mils (0.025 mm to 0.076 mm).

Layer 20 may also comprise a pressure sensitive adhesive as described above for layer 13. Layer 20 may also comprise bitumen. Layer 20 may also comprise rubber and bitumen. For the case where layer 20 comprises a pressure sensitive adhesive, bitumen, or bitumen and rubber, the thickness is in the range from 1 mil to 50 mils (0.025 mm to 1.27 mm). For the case where layer 20 comprises a pressure sensitive adhesive, bitumen, or bitumen and rubber the underlayment 23 exhibits nail sealing characteristics, i.e. the material of layer 20 tends to seal around nails that are made to penetrate the underlayment 23.

The underlayment 23 of FIG. 4 may be made in several ways. A preferred process is described as follows. A coextruded film comprising layers 14 and 16 is made in a coextrusion process. Next the coextruded film 14/16 is laminated to woven fabric 15 via extrusion lamination with lamination layer 20. A solution comprising a pressure sensitive adhesive or filled textured binder is coated on to the other face of woven fabric 15, and the solvent is removed via evaporation leaving layer 13.

Figure 5:
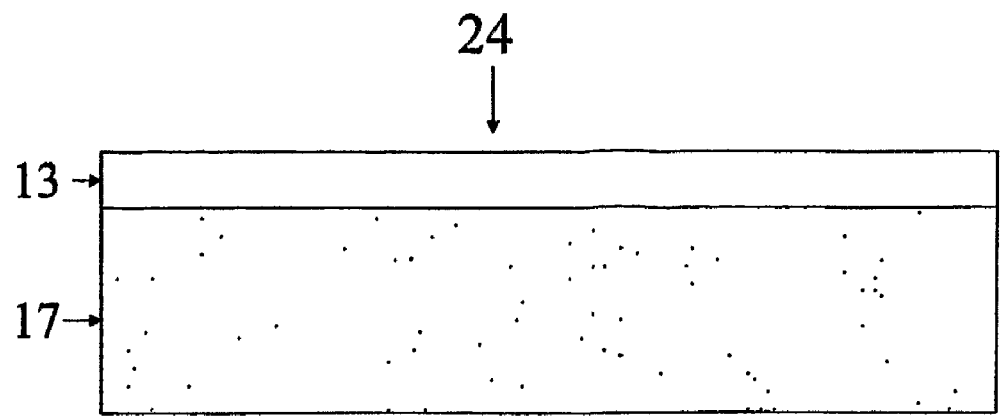
FIG. 5 is a schematic diagram of a roofing underlayment in accordance with a still further embodiment of the present invention.

The embodiment 24 of FIG. 5 shows a polyethylene or polypropylene film 17, and a layer of pressure sensitive adhesive 13 on one face thereof. Cross-laminated films are preferred, such as cross-laminated films commercially available from Van Leer under the trademark VALERON. Other suitable cross-laminated films are those manufactured by Interplas/Formosa.

Another embodiment of the invention (not shown) is an organic or inorganic roofing felt coated with a pressure sensitive adhesive or a filled textured binder. An organic roofing felt comprises paper saturated with asphalt. An inorganic roofing felt comprises a non-woven glass fabric saturated with asphalt.

Figure 6:
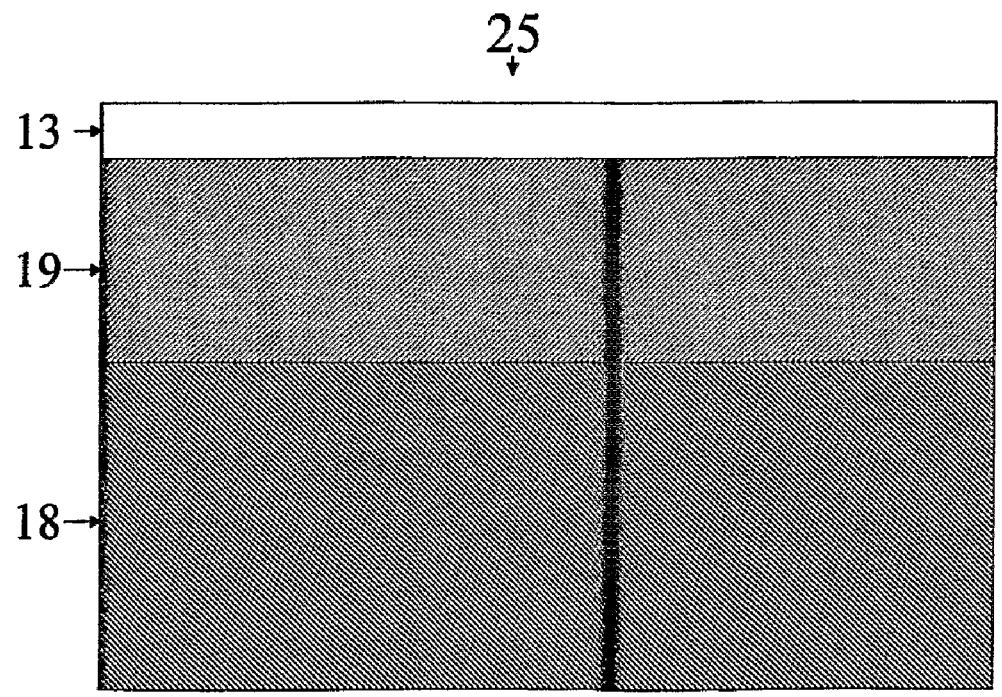
FIG. 6 is a schematic diagram of a roofing underlayment in accordance with yet another embodiment of the present invention.

FIG. 6 illustrates an embodiment 25 of a self-adhering underlayment comprising a support layer 19, a pressure sensitive adhesive layer or filled textured binder layer 13 on one major surface thereof, and a second pressure sensitive adhesive 18 on the opposite major surface thereof. The pressure sensitive layer 18 may include rubber modified bitumen, and non-bituminous adhesives comprising rubbers such as SIS, SBS, SEBS, SBR, natural rubber, silicone, butyl rubber, isoprene, butadiene and acrylic rubber. Preferably the layer 18 is used in a thickness of greater than or equal to 5 mils (0.13 mm), more preferably greater than or equal to 20 mils (0.51 mm).

The support layer 19 comprises a film, a woven fabric, a non-woven fabric, or a combination of these. Preferably, the films comprise a polyolefin, polyethylene, polypropylene, a polyester, or a combination of these materials.

The non-skid underlayments of the present invention exhibit a unique combination of valuable features in comparison to other underlayments including: excellent skid resistance, yet are still trafficable (the shoe soles of a pedestrian walking on the surface of an underlayment of the present invention do not become stuck to the underlayment), particularly when wet, lightweight, rollable, and unrollable. For embodiments comprising a filled textured binder, where the binder is a pressure sensitive adhesive or a rubber, a unique combination of mechanisms act to impart a high coefficient of friction, particularly when wet. Futhermore, for embodiments comprising a filled textured binder the filler is better adhered to the support sheet in comparison to the case for other underlayments where the surface comprises an exposed filler or aggregate.

Skid resistance is demonstrated in example 2 below. Underlayments of the present invention are lightweight in comparison to other underlayments (and other roofing products) comprising filler or aggregate on the surface because a moderate level of filler is used and the particle size of the filler is small.

It was also surprising that a surface could be rendered skid resistant with a pressure sensitive adhesive without compromising the ability to unroll the membrane or walk on the membrane without becoming stuck. For embodiments where the skid resistant layer comprises only a pressure sensitive adhesive this is achieved by use of a very thin layer of pressure sensitive adhesive, typically less than 10 μm thick, preferably less than about 5μm thick, more preferably less than about 3 μm thick. If a thick layer of pressure sensitive adhesive were used as the non-skid layer the underlayment would be impossible or difficult to unroll. For example, for a 30 in. (76 cm) wide membrane the minimum force required to unroll the membrane comprising more than about 5 mils (0.13 mm) of pressure sensitive adhesive or binder would be equal to or greater than 30 lbs. For embodiments comprising a filled textured binder, where the binder is a pressure sensitive adhesive or rubber, (rubbers are slightly tacky) excellent skid resistance, particularly when wet, is achieved by the use of a thin non-skid layer that is textured with a small particle size filler.

While not being bound by any specific theory, it is believed that non-skid properties are provided by adhesion of the non-skid coated underlayment to the shoe sole of the walker and, where the coating includes filler particles, an additional mechanical interlock of the non-skid coated underlayment to the shoe sole of the walker. For embodiments of the invention where the binder is a resin, it is believed that mechanical interlock substantially provides for skid resistance because the resins provide little or no adhesion.

The preferred manufacturing method comprises providing a coating solution comprising a mixture of an organic solvent, binder, and filler particles, and coating the coating solution onto a flexible substrate (or support layer), then removing the solvent by evaporation. This method is preferred because the filler is well bonded to the support sheet in comparison to other manufacturing methods by virtue of being substantially coated with binder. Other methods may be utilized to coat a filled textured binder on to a support sheet. Of course, other underlayments and other roofing products also may be utilized in accordance with the present invention.

Other applications for the non-skid coating are contemplated. The non-skid layers of the present invention may be applied to plywood and oriented strand board. Use of these coated decking materials enhances skid resistance particularly when these materials are used on a sloped roof deck. Another application is non-skid flexible packaging materials. For example, plastic sacks may be coated with the non-skid layers of the present invention to prevent sliding of stacked arrays of products.

Coating compositions may be prepared by a variety of methods with various types of mixers, e.g., horizontal and vertical batch type mixers. Ideally, a medium intensity or high intensity mixer is used, such as, for example, a medium intensity horizontal paddle mixer, a high speed Cowels dissolver, a rotor/stator high speed mixer, and others. An in-line rotor stator mill or an in-line media mill are particularly useful for effectively dispersing filler(s) into a binder coating. For coatings comprising a pressure sensitive adhesive, the solvent is charged into a batch type mixer and the agitator is turned on. Adhesive ingredients including rubber(s), plasticizer(s) and tackifier are metered into the mixer and mixed until dissolved. Alternatively, the pressure sensitive adhesive may be hot melt compounded, formed into blocks or chips, cooled, added to solvent in a batch type mixer, and mixed until dissolved. For coatings that comprise a pressure sensitive adhesive and a filler, a solution of the pressure sensitive adhesive may be prepared first followed by filler addition and additional mixing. Alternatively, filler and adhesive ingredients may be added simultaneously to solvent in a batch mixer. After all ingredients are combined, the mixture of solvent, binder, and filler may be circulated through an in-line mixer like a rotor stator in-line mixer or a media mill to affect optimal mixing. If the binder comprises only rubber, the rubber is added via procedures similar to those described above for adhesives.

EXAMPLE 1

A blocking test was conducted, which is a severe test designed to develop an understanding of blocking on a relative basis. A control membrane, a polyolefin (PO) coated non-woven is easily unrolled. The polyolefin coated control membrane comprises a 2 oz/yd$^2$ (67.8 g/m$^2$) non-woven polypropylene fabric coated on each side with 1.25 mils (0.032 mm) coextruded layer. On the side in contact with the slid-resistant layer the coex layer comprise 1.0 mil (0.0254 mm) layer PP/LDPE blend and a 0.25 mils (0.006 mm) layer comprising a copolymer of ethylene and methyl acrylate. The thin layer faces outward. The coex layer on the other side of the non-woven comprises a 1 mil layer of a PP/LDPE blend and a 0.25 mil layer comprising an ethylene/propylene copolymer. The thin layer faces outward. If an experimental membrane exhibits an ability to unroll as easily or more easily versus the control in the accelerated test, than it is assumed that the experimental membrane will unroll easier than the control under normal circumstances.

The accelerated tests involve the application of high pressure and high temperature. Two sheets of membrane are positioned on top of the other with the surfaces to be tested in contact with one another. The sheets are sandwiched between 2 steel plates. The assembly is loaded in a heated press to 250 psi at 75° C. for 16 hrs. The force required to peel the sheets apart is then measured with a mechanical test device such as an Instron. The peel rate is 2 in/min. A T-Peel test geometry is used. Results are shown in the five Tables below. In the Tables, "SIS" is a styrene/butadiene/styrene block copolymer, "PO" is polyolefin, "PP" is polypropylene, "HDPE" is high density polyethylene, "SEBS" is styrene/ethylene/butylene/styrene block copolymer, and "PSA" indicates a pressure sensitive adhesive.

Figure 11:
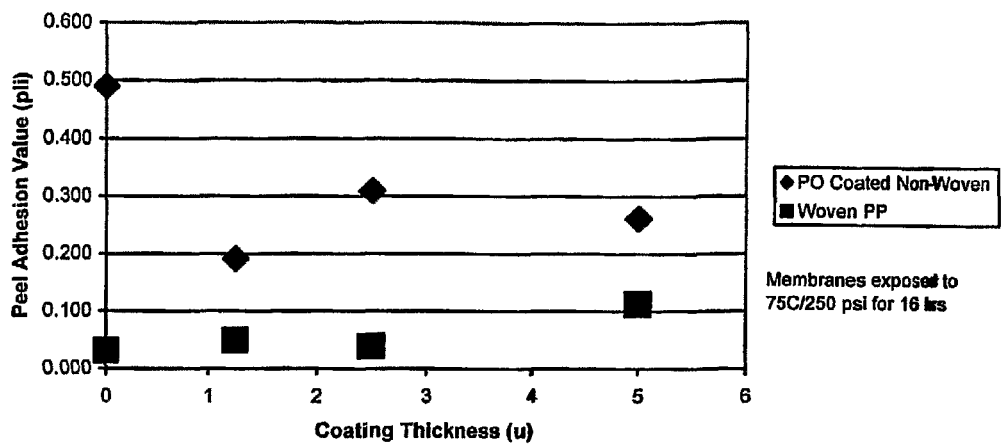
FIG. 11 is a plot of adhesion value, a measure of blocking, versus adhesive coating thickness for an SIS pressure sensitive adhesive on various membranes.
Figure 12:
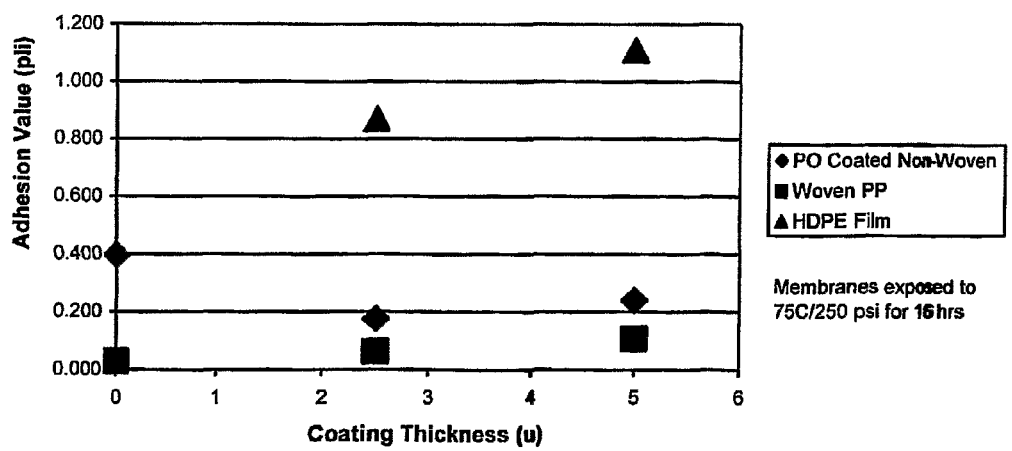
FIG. 12 is a plot of adhesion value, a measure of blocking, versus adhesive coating thickness for an acrylic pressure sensitive adhesive on various membranes.
Figure 13:
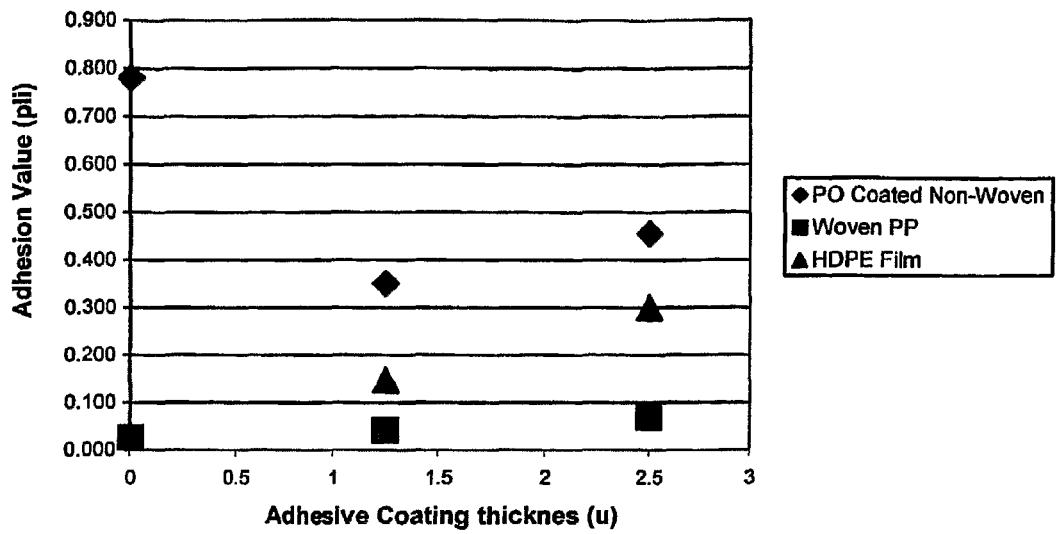
FIG. 13 is a plot of adhesion value, a measure of blocking, versus adhesive coating thickness for an SEBS pressure sensitive adhesive on various membranes.

In FIGS. 11-13, peel force, a measure of blocking, is plotted versus the pressure sensitive adhesive coating thickness. An SIS, acrylic, and an SEBS pressure sensitive adhesive were evaluated by coating on different membranes including a polyolefin coated non-woven (described above), a membrane that comprises a 2 oz/yd$^2$ polypropylene woven fabric laminated to a 1 mil (0.0254 mm) polypropylene/ethylene vinyl acetate wherein the ethylene vinyl acetate layer faces outward coextruded film with 1 mil of a polypropylene/polyethylene mixture, and an HDPE film which is 3 mil (0.076 mm) Valeron.

With the exception of the acrylic coated HDPE film, all pressure sensitive adhesive coated webs exhibited a lower resistance to blocking versus the control (FIGS. 11 to 13).

Figure 14:
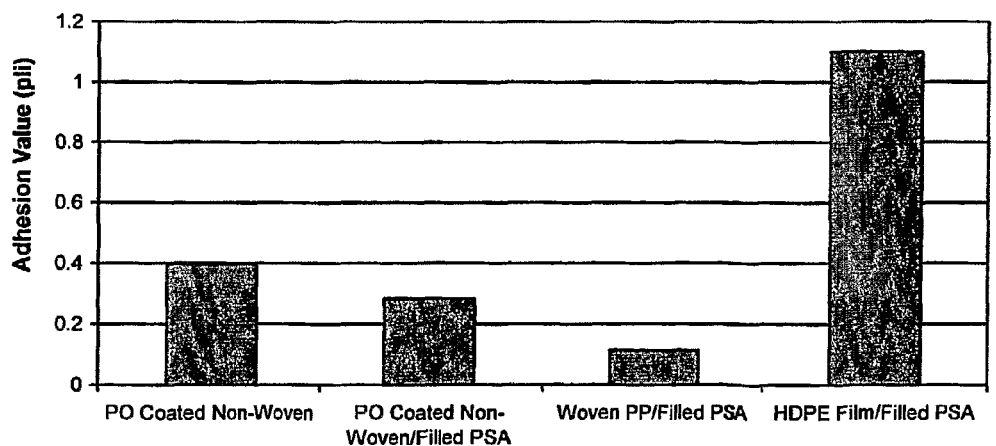
FIG. 14 is a plot of adhesion value, a measure of blocking, versus membrane type for a filled acrylic pressure sensitive adhesive.

Blocking was also evaluated for membranes coated with a filled textured acrylic pressure sensitive adhesive and the results are shown in FIG. 14. The filled coating comprises 75 percent, by weight, of a 325 mesh calcium carbonate. The volume of the coating on each membrane was about 0.93 cm$^3$/ft$^2$ (10.0 cm$^3$/m$^2$) (weight=16 g/yd$^2$). All membranes coated with the filled pressure sensitive adhesive exhibit lower resistance to blocking versus the control.

Figure 15:
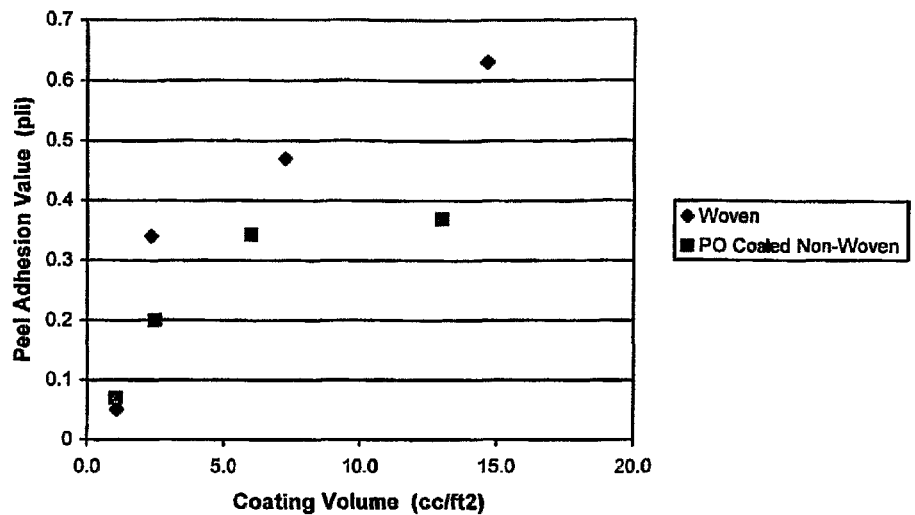
FIG. 15 is a plot of adhesion value, a measure of blocking, versus coating volume for a filled SEBS pressure sensitive adhesive on various membranes.

Blocking was also evaluated for membranes coated with a filled textured SEBS pressure sensitive. The filler is 325 mesh calcium carbonate. The effects of coating volume and membrane type were evaluated. Coating volume was varied between about 1cm$^3$/ft$^2$ to 15cm$^3$/ft$^2$ (10.8 cm$^3$/m$^2$ to 161 cm$^3$/m$^2$). Two membranes were evaluated. One comprises the polyolefin coated non-woven as described above. The other comprises the polypropylene woven as described above. The results are given in FIG. 15. Note that the level of blocking is proportional to the coating volume. The blocking level exhibits a peel force of less than 0.5 pli (pound per linear inch) for coating volumes less than about 10 cm 3/ft$^2$ (108 cm$^3$/m2).

Figure 16:
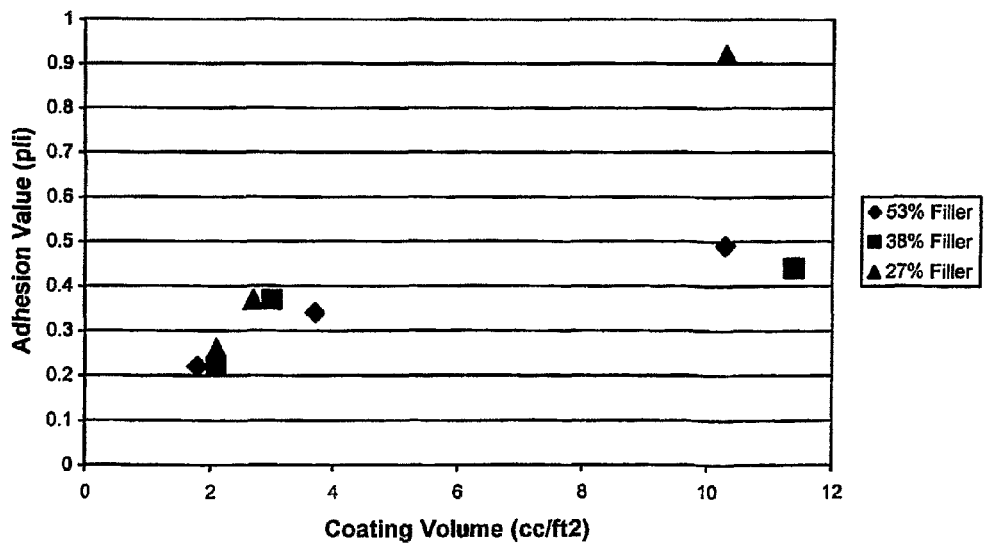
FIG. 16 is a plot of adhesion value, a measure of blocking, versus coating volume for a filled SEBS pressure sensitive adhesive at various loadings of filler by volume.

Blocking was also evaluated for membranes coated with a filled textured SEBS pressure sensitive adhesive and the results are shown in FIG. 16. The effects of filler volume percent and the effects of coating volume on blocking were evaluated. The filler was a 325 mesh calcium carbonate. Blocking is lowest for underlayments comprising a low coating volume and a high percent by volume of filler. For the underlayment comprising a coating with 27 percent filler by volume and 10.3 cm$^3$/ft$^2$ of coating blocking is severe.

EXAMPLE 2

Skid resistance was measured in a "walk on" test as follows. Underlayment specimens to be tested were mechanically attached to a sheet of plywood and positioned at a test angle of 40°. The samples were sprayed with water prior to testing. A tester ("walker") walks over the sample and compares the wet skid resistance of the sample to a "control", which was a membrane comprising a 2 side polyolefin-coated polypropylene non-woven described above. The "walker" judges the sample membrane to exhibit better, similar or worse slid resistance versus the control membrane. The results for various underlayments tested are shown in Table 1. Samples 1-13 are embodiments of the present invention and all exhibit superior wet skid resistance in comparison to the control membrane. It is also important to note that water-based binders comprising a surfactant impart poor wet skid resistance. See test results for specimens 25 to 27 in Table 1 where all of the non-slid layers are acrylic emulsions commercially available from Rohm and Haas company. In the "walk on" test, these binders have poor wet adhesion to the support sheet which contributes to poor wet skid resistance. It is believed that the surfactant also lowers the surface tension of water on the wet surface which contributes to poor wet skid resistance.

TABLE 1

| No. | Support Layer | Non-Skid Layer | Wet Skid Resistance |
|---|---|---|---|
| 1 | 2 side polyolefin coated non-woven polypropylene[1] | 5 u SIS PSA | Better |
| 2 | 2 side polyolefin coated non-woven polypropylene[1] | 5 u SEBS PSA | Better |
| 3 | 2 side polyolefin coated non-woven polypropylene[1] | 5 u Acrylic PSA | Better |
| 4 | Woven polypropylene-polypropylene film laminate[2] | 5 u SIS PSA | Better |
| 5 | Woven polypropylene-polypropylene film laminate[2] | 5 u SEBS PSA | Better |
| 6 | Woven polypropylene-polypropylene film laminate[2] | 5 u Acrylic PSA | Better |
| 7 | 2 side polyolefin coated non-woven polypropylene[1] | 1 cc/ft2 - 325 mesh CaCO3/SIS PSA (53% by volume CaCO3) | Better |
| 8 | 2 side polyolefin coated non-woven polypropylene[1] | 1 cc/ft2 - 325 mesh CaCO3/SEBS PSA (53% by volume CaCO3) | Better |
| 9 | 2 side polyolefin coated non-woven polypropylene[1] | 1 cc/ft2 - 325 mesh CaCO3/acrylic PSA (53% by volume CaCO3) | Better |
| 10 | Woven polypropylene-polypropylene film laminate[2] | 1 cc/ft2 - 325 mesh CaCO3/SIS PSA (53% by volume CaCO3) | Better |
| 11 | Woven polypropylene-polypropylene film laminate[2] | 1 cc/ft2 - 325 mesh CaCO3/SEBS PSA (53% by volume CaCO3) | Better |
| 12 | Woven polypropylene-polypropylene film laminate[2] | 1 cc/ft2 - 325 mesh CaCO3/acrylic PSA (53% by volume CaCO3) | Better |
| 13 | 2 side polyolefin coated non-woven polypropylene[1] | 2 cc/ft2 - Portland Cement/amorphous polyolefin (Eastoflex P1010-Eastman) (53% by volume Portland Cement) | Better |
| 14 | Woven polypropylene-polypropylene film laminate[2] | 1 cc/ft2 - 325 mesh CaCO3/butyl rubber (53% by volume CaCO3) | Better |
| 15 | Woven polypropylene-polypropylene film laminate[2] | 1 cc/ft2 - 325 mesh CaCO3/chloroprene rubber (53% by volume CaCO3) | Better |
| 16 | 2 side polyolefin coated non-woven polypropylene[1] | none | NA (control) |
| 17 | Woven polypropylene-polypropylene film laminate | none | Same |
| 18 | 2 side polyolefin coated non-woven polypropylene[1] | 1 oz/yd2 hot melt spray applied amorphous polyolefin (Eastoflex P1010-Eastman) | Same |

TABLE 1-continued

| No. | Support Layer | Non-Skid Layer | Wet Skid Resistance |
|---|---|---|---|
| 19 | Woven polypropylene-polypropylene film laminate[2] | 1 oz/yd2 hot melt spray applied amorphous polyolefin (Eastoflex P1010-Eastman) | Same |
| 20 | EPDM Rubber Sheet | none | Same |
| 21 | 2 side polyolefin coated non-woven polypropylene[1] | 2 to 3 oz/yd2 embossed low molecular weight polyethylene/tackifier blend (70/30 by weight) | Same |
| 22 | Woven polypropylene-polypropylene film laminate[2] | 2 to 3 oz/yd2 embossed low molecular weight polyethylene/tackifier blend (70/30 by weight) | Same |
| 23 | Web comprising HPDE woven fabric and polyolefin grid with nodes[3] | polyolefin coated polyolefin grid with nodes | Same |
| 24 | Web comprising spunbonded/thermobonded polypropylene non-woven fabric surface[4] | spunbonded/thermobonded polypropylene non-woven fabric surface | Worse |
| 25 | Woven polypropylene-polypropylene film laminate[2] | 4 cc/ft2 - CaCO3/dry Acronal S400 (53% by volume CaCO3) | Worse |
| 26 | Woven polypropylene-polypropylene film laminate[2] | 2.8 cc/ft2 - CaCO3/dry Acronal A3234 (53% by volume CaCO3) | Worse |
| 27 | Woven polypropylene-polypropylene film laminate[2] | 4.1 cc/ft2 - CaCO3/dry Acronal V275 (53% by volume CaCO3) | Worse |
| | Acronal S400 | acrylic emulsion | 2.3 |
| | Acronal A3234 | acrylic emulsion | 1.2 |
| | Acronal V275 | acrylic emulsion | 1.9 |

1-2 oz/yd non-woven polypropylene fabric coated on each side with 1.25 mils coex layer. On the side in contact with the skid-resistant layer the coax layer comprise 1.0 mil layer PP/LDPE blend and a 0.25 mils layer comprising a copolymer of ethylene and methyl acrylate. The coex layer on the other side of the non-woven comprises a 1 mil layer of a PP/LDPE blend and a .25 mil mayer comprising an ethylene/propylene copolymer

EXAMPLE 3

Adhesion of the non-skid coating to the support sheet is measured in a peel adhesion test using a pre-formed pressure sensitive tape. A 2 in. wide preformed tape, "Preprufe® Tape", is applied to the non-skid coated face of the underlayment. The sample is rolled 4 times, at 1 second per pass, with a 30 lb roller. Adhesion is measured in a T-peel adhesion test 15 min after rolling at a cross head speed of 2 in. per minute with an Instron mechanical tester. Results for various underlayments comprising a woven polypropylene mesh coated with a filled textured binder are shown in Table 2. Note that all underlayments, except-for that comprising gilsonite, passes the minimum adhesion requirement for an underlayment comprising a filled textured binder. Also note that the three underlayments comprising the acrylic emulsion binders in the non-skid layer also pass the minimum adhesion requirement. However, these underlayments exhibit poor wet skid resistance as noted in example 2 because these binders are water-based and comprise a surfactant. These binders have poor wet adhesion to the support sheet. It is believed that the surfactant also lowers the surface tension of water on the wet surface which contributes to poor wet skid resistance.

TABLE 2

| Binder Trade Name | Binder Type* | Avg. Load (pli) | Coating Volume (cc/ft2) |
|---|---|---|---|
| Elastotac H130 | hydrocarbon resin | 1.9 | 2.0 |
| Gilsonite | | 0.1 | 3.3 |
| Neoprene | Chloroprene rubber | 1.9 | 1.0 |
| | Butyl rubber | 3.4 | 0.9 |
| Acronal S400 | acrylic emulsion | 2.3 | 4.0 |
| Acronal A3234 | acrylic emulsion | 1.2 | 2.8 |
| Acronal V275 | acrylic emulsion | 1.9 | 4.1 |
| | SEBS PSA | 3.3 | 1.6 |

*53 percent filler, CaCO3, by volume for all formulations

EXAMPLE 4

For embodiments comprising a filled textured binder texturing may be observed via scanning electron microscopy SEM. SEM photomicrographs were recorded for a membranes comprising a woven polypropylene support sheet coated with binders comprising an SEBS adhesive filled with CaCO3. The volume fraction of filler was varied between 53 percent and 27 percent by volume. See FIGS. 7A, 7B, and & 7C for non-skid coatings comprising 53 percent, 38 percent, and 27 percent filler, respectively. Note that texturing may be observed even down to 27 percent by volume of filler.

We claim:

1. A pedestrian trafficable skid-resistant flexible article, said article adapted to be stored in a roll and unrolled prior to application to a surface, said article comprising a flexible substrate suitable for application to a roof, floor or package, said flexible substrate comprising at least one support layer comprising a woven fabric, a non-woven fabric, a polyolefin film, spun bonded polypropylene or woven polypropylene and having a first major surface adapted to contact said roof, floor or package and an opposite second major surface adapted to be exposed to pedestrian traffic, wherein said second major surface has a non-skid coating comprising a filled textured binder, wherein the filled textured binder is a pressure sensitive adhesive and includes inorganic filler particles in an amount of at least 25 percent by volume of the filled textured binder, and wherein at least 98% of the filler particles within a selected 100 cm$^2$ area of the non-skid coating are completely coated with the binder.

2. The article of claim 1 adapted for use as a roofing underlayment, wherein upon application of said underlayment to a roof, the non-skid coating provides a skid resistant surface for foot traffic thereon.

3. The article of claim 2 wherein the flexible substrate includes a support layer comprising a cross-laminated high density polyethylene film.

4. The article of claim 2 wherein the flexible substrate comprises one or more layers of polymer and one or more layers of fabric.

5. The article of claim 2 wherein said first major surface includes a pressure sensitive adhesive adapted to adhere said underlayment to a roof.

6. The article of claim 5 wherein the pressure sensitive adhesive on said first major surface comprises rubber and bitumen.

7. The article of claim 1 wherein the pressure sensitive adhesive comprises a rubber selected from the group consisting of styrene/isoprene/styrene block copolymers, styrene-butadiene-styrene block copolymers, styrene-ethylene-butylene-styrene block copolymers, styrene/butadiene rubber, natural rubber, silicone rubber, butyl rubber, polyisoprene, polyisobutylene, chloroprene, ethylene-propylene rubber, ethylene alpha olefin, polybutadiene, nitrile rubbers, and acrylic rubber.

8. The article of claim 7 wherein the filler particles are selected from the group consisting of calcium carbonate, silica, clay, talc, vermiculite, mica, titanium dioxide, fly ash, alumina trihydrate, and slag.

9. The article of claim 8 wherein the filled textured binder comprises filler particles in an amount of at least 45 percent by volume of the filled textured binder.

10. The article of claim 7 wherein the filled textured binder comprises filler particles in an amount of at least 45 percent by volume of the filled textured binder, wherein the filler particles have an average particle size of about 0.1 μm to about 20 μm, and wherein the volume of non-skid coating is 0.2 cm$^3$/ft$^2$ (2.15 cm$^3$/m$^2$) to 2 cm$^3$/ft$^2$ (21.5 cm$^3$/m$^2$).

11. The article of claim 1 wherein the filler particles have an average particle size of less than 50 μm.

12. The article of claim 1 wherein the filler particles have an average particle size of less than 25 μm.

13. The article of claim 1 wherein the filler particles have an average particle size of about 0.1 μm to about 20 μm.

14. The article of claim 1 wherein the volume of non-skid coating is less than 10 cm$^3$/ft$^2$ (107.6 cm$^3$/m$^2$).

15. The article of claim 1 wherein the volume of non-skid coating is less than 5 cm$^3$/ft$^2$ (53.8 cm$^3$/m$^2$).

16. The article of claim 1 wherein the volume of non-skid coating is 0.2 cm$^3$/ft$^2$ (2.15 cm$^3$/m$^2$) to 2 cm$^3$/ft$^2$ (21.5 cm$^3$/m$^2$).

17. The article of claim 1 wherein the filler particles comprise calcium carbonate.

18. The article of claim 1 wherein the filler particles are hydratable.

19. A method of waterproofing a roof, comprising the steps of:
providing a roll of roofing underlayment according to claim 2; and
unrolling said roofing underlayment and applying the roof underlayment to said roof such that the non-skid coating is exposed to foot traffic.

20. The method of claim 19 wherein said underlayment is applied to said roof by mechanical fastening.

21. The method of claim 19 wherein said underlayment is applied to said roof by adhesively adhering said underlayment to said roof.

22. A method of making a pedestrian trafficable skid-resistant flexible article comprising:
providing a flexible substrate suitable for application to a roof, floor or package, said substrate having a first major surface adapted to contact said roof, floor or package and an opposite second major surface adapted to be exposed to pedestrian traffic;
coating said second major surface with a non-skid coating comprising a pressure sensitive adhesive, inorganic filler particles and a solvent for the pressure sensitive adhesive; and
evaporating the solvent from said non-skid coating, whereby at least 98% of the filler particles within a selected 100 cm$^2$ area of the non-skid coating are completely coated by the pressure sensitive adhesive.

23. The method of claim 22 wherein the volume of non-skid coating is 0.2 cm$^3$/ft$^2$ (2.15 cm$^3$/m$^2$) to 2 cm$^3$/ft$^2$ (21.5 cm$^3$/m$^2$).

* * * * *